US006793264B1

(12) United States Patent
Müller et al.

(10) Patent No.: US 6,793,264 B1
(45) Date of Patent: Sep. 21, 2004

(54) CLOSING DEVICE, IN PARTICULAR FOR A MOTOR VEHICLE

(75) Inventors: Thorsten Müller, Koblenz (DE); Bernd Rosenstein, Bonefeld (DE); Colin Rich, Neuwied (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 10/420,421

(22) Filed: Apr. 22, 2003

(51) Int. Cl.$^7$ .................................... B62D 33/03
(52) U.S. Cl. ........................ 296/57.1; 16/71; 49/386
(58) Field of Search ...................... 296/50, 57.1, 61; 16/71, 72; 49/386; 414/537

(56) References Cited

U.S. PATENT DOCUMENTS

| | | | | | |
|---|---|---|---|---|---|
| 3,389,422 A | | 6/1968 | Glenn | | |
| 4,601,131 A | | 7/1986 | Ozols | | |
| 5,954,383 A | * | 9/1999 | Beck et al. | ......... | 296/50 |
| 6,183,031 B1 | * | 2/2001 | Ballard et al. | ......... | 296/57.1 |
| 6,196,609 B1 | * | 3/2001 | Bowers | ......... | 296/57.1 |
| 6,550,840 B2 | * | 4/2003 | Rayburn | ......... | 296/57.1 |

FOREIGN PATENT DOCUMENTS

| | | | | |
|---|---|---|---|---|
| FR | 2 717 215 | | 9/1995 | E05F/15/12 |
| FR | 2 796 097 | | 1/2001 | |
| GB | 0510464 | * | 8/1939 | 296/57.1 |

* cited by examiner

*Primary Examiner*—Joseph D. Pape
(74) *Attorney, Agent, or Firm*—Cohen, Pontani, Lieberman & Pavane

(57) ABSTRACT

Closing device, in particular for a body part on a motor vehicle, the body part being mounted pivotably on a base part, includes a spring element having a piston rod which is axially moveable within a cylinder to exert a closing force on the body part via a cable device, which engages on the body part. The spring element has, on its piston rod, a deflection pulley over which the cable device is guided, the end of the cable device being fixed with respect to the cylinder.

12 Claims, 4 Drawing Sheets

CLOSING DEVICE, IN PARTICULAR FOR A MOTOR VEHICLE

BACKGROUND OF THE INVENTION

1. Field of the Invention

The invention relates to a closing device for a body part pivotably mounted on a base part having a spring element including a piston rod which is axially moveable in a cylinder and a cable device which engages the body part.

2. Description of the Related Art

FR 2 717 215 A1 describes a closing device, in particular for a body part on a motor vehicle, the body part being mounted pivotably on a base part and a pneumatic spring element having an axially moveable piston rod, as a first subassembly, within a cylinder, as a second subassembly, which exerts a closing force on the body part via a cable device, which engages on the body part.

In the exemplary embodiment according to FIG. 3, the cable device comprises two subunits which are actuated in the tension direction by the gas-filled spring. The vehicle flap pivots in the closing direction to the same extent as the piston rod is moved. For an effective transmission of tensile force, the two subunits have to be coordinated with each other exactly in terms of their length, since otherwise only one of the two subunits is tensioned by the pneumatic spring element.

In the variant according to FIG. 4, the cable device is of single-part design. One end is fastened to the body and the second end is fastened to the piston rod of the pneumatic spring element. Deflection pulleys on the pivotable body part ensure that an axial movement of the piston rod of the pneumatic spring element is converted into a pivoting movement of the body part. In the case of this construction principle, there is the serious disadvantage that the stroke movement of the piston rod is converted into a pivoting movement of the body part only in the ratio of 2:1. Consequently, a corresponding long, pneumatic spring element has to be used. However, there is virtually no suitable connecting point for this, in particular in the region of the trunk in a motor vehicle.

SUMMARY OF THE INVENTION

The object of the present invention is to realize a compact spring element for a closing device.

According to the invention, the object is achieved by the spring element having, on its axially moveable subassembly, a deflection pulley over which the cable device is guided, the end of the cable device being connected in a positionally fixed manner with respect to the other subassembly.

The effect achieved by the axially moveable deflection pulley for the cable device is that the ratio of piston-rod movement to pivoting movement of the body part is 1:2. The fitting of an extremely short spring element is therefore possible.

For this purpose, the piston rod has a connecting head to which the deflection pulley is fastened.

According to a preferred embodiment, a stop which is effective in the retraction direction of the piston rod is formed between the two subassemblies of the spring element. A stop between the body part and the base part is rendered superfluous. Furthermore, there can be more variation with regard to the technical configuration of the spring element, since it is not necessary for a given spring force to retain the body part in a defined rest position.

In a further advantageous refinement, the connecting head has the stop. The stop is freely accessible in the event of any repairs.

In particular in order to protect the cylinder and in order to minimize noise, the cylinder has a counter stop on which the stop comes to rest.

In order to simplify the installation, the positionally fixed end of the cable device is fastened to a securing means which supports the spring element.

Furthermore, provision may be made for the effective length of the cable device to be adjustable by shifting the positionally fixed end. By this means, a certain position of the pivotable component with respect to a desired extension position of the piston rod of the spring element can be set. Furthermore, if a second cable device which is independent of the first cable device, which interacts with the spring element, is used, both cable devices can be matched in their length for the purpose of compensating tolerances.

For this purpose, the positionally fixed end of the cable device is retained by a fixing sleeve which is mounted in a manner such that it can be adjusted. For example, the fixing sleeve has a threaded section which engages in the securing means for the spring element. In this case, the positionally fixed end of the cable device is guided through the fixing sleeve and can move in the circumferential direction with respect to the fixing sleeve, so that a torsional movement is not introduced into the cable device when the cable device is adjusted.

In one embodiment, the cable device engages on the moveable body part at two supporting points and, at a predetermined angular position of the body part, two sections of the cable device exert a supporting force, with a stop device, as part of the cable device, being in engagement during the closing movement owing to the spring force of the spring element. The effect achieved is that, firstly, the favorable stroke/body-part movement ratio is maintained and, secondly, two supporting points can be used, with the result that the introduction of force into the body part can be undertaken more favorably.

In addition, the stop device can have a stop ring which can be displaced axially on the cable device in order to adjust the stop device. By this means, freedom from play within the closing device during the closing movement is achieved.

As an alternative, two spring elements arranged parallel in their function may also be used, with a single cable device being connected to both spring elements. The favorable movement ratio of spring element and body part is also achieved in this variant. The freedom from play within the closing system arises automatically, since the two spring elements prestress the cable device owing to the directions in which their forces act.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
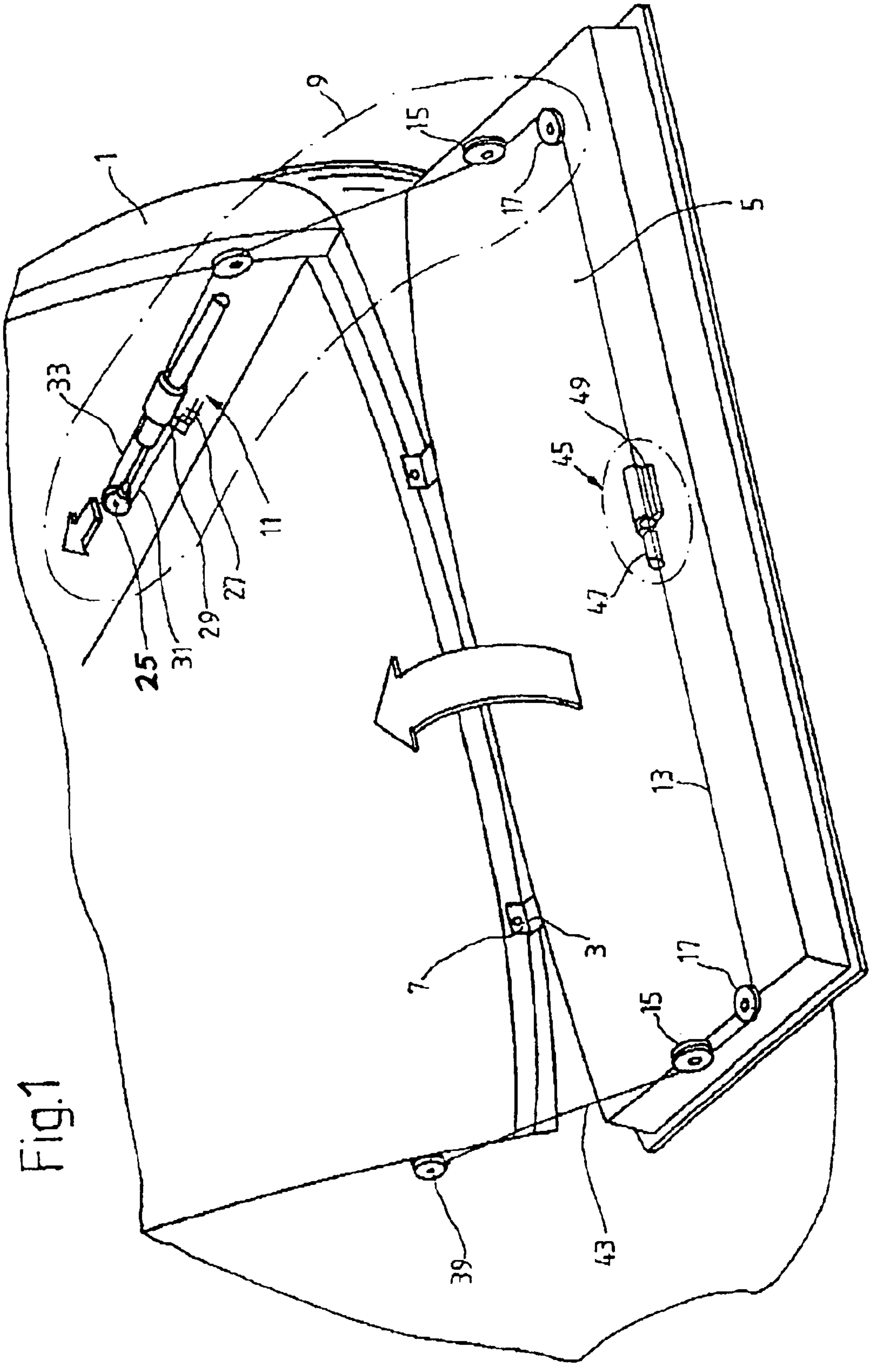
FIG. 1 shows the entire system of the closing device.

FIG. 1 shows the rear part of a motor vehicle having a base part 1 and a body part 5 which can be pivoted about an axis 3, which runs transversely with respect to the longitudinal axis of the base part. The axis 3 is formed by a number of pivot bearings 7. The body part is, for example, the tailgate of a vehicle.

The tailgate is moved by a closing device 9 in the direction of the arrow from any opened position. The force is introduced starting from a spring element 11 and a cable device 13 which acts on the body part 5 via deflection pulleys 15; 17.

Figure 2:
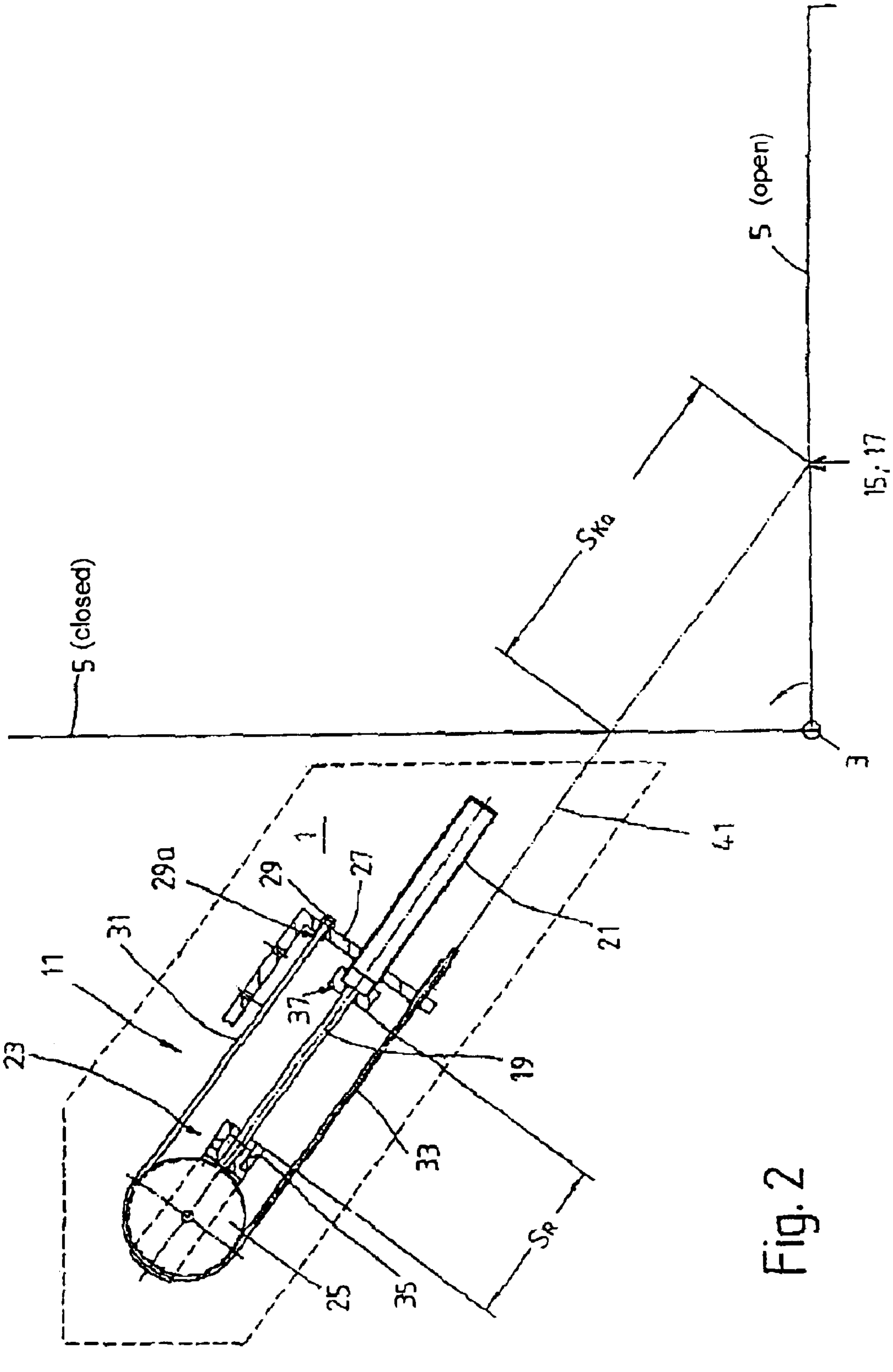
FIG. 2 shows the spring element as an individual part.

In the overall view of FIG. 2, it can be seen that the spring element 11, as a first subassembly, has an axially moveable piston rod 19 and, as a second subassembly, a cylinder 21 which is positionally fixed with respect to the base part 1. Fastened to the outer end of the piston rod is a connecting head 23 having a deflection pulley 25 over which the cable device 13 is guided. A first end 29 of the cable device is connected to a securing bracket 27, by means of which the entire spring element is also fastened to the base part. The positionally fixed end 29 of the cable device is retained in the securing bracket 27 in an axially adjustable manner by a fixing sleeve 29*a* having a threaded section, in order to be able to adjust the effective length of the cable device. The spring element is preferably a gas-filled spring exerting a push-out force on the piston rod. By means of suitable measures on the spring element, in addition to the spring action, damping of the movement of the piston rod can 19 also be achieved, for example by means of a piston which is fastened to the piston rod and which has constricted openings for a gaseous or hydraulic damping medium in the cylinder 21.

In this simplified illustration, the body part 5, which is illustrated as a solid line, has, instead of the two deflection pulleys 15; 17 according to FIG. 1, just one fastening point, this fact being insignificant for the functioning of the invention. Starting from a horizontal end position of the body part (by way of example), the piston rod 19 executes a synchronous axial movement with respect to the pivoting movement of the body part 5. Owing to the deflection pulley 25 and the fastening of the first end 29 in a positionally fixed manner with respect to the cylinder, each piston-rod stroke length is carded out by both subsections 31; 33 of the cable device, starting from the deflection pulley 25. This change in length of the subsections based on the movement of the piston rod has the result that a length $S_{K_a}$ is in the ratio 2:1 to a length $S_R$. This ratio of lengths permits the use of a particularly short spring element in order to be able to initiate the movement of the body part 5.

A stop 35 is arranged on that side of the connecting head 23 which faces the cylinder 21, this stop coming to rest on a counter stop 37 on the cylinder at a maximum opening position of the moveable body part. Stops on the body can therefore be omitted.

It can be seen in FIG. 1 that the cable device consists of a single-part cable element, the other end 39 of which is fastened to the base part 1. There are thus two cable sections 41; 43 which exert a supporting force on the body part 5 at two supporting points, which in this case are formed by the deflection pulleys 15; 17, with a stop device 45, as part of the cable device, being in engagement during the closing movement owing to the spring force of the spring element 11.

During installation, the body part is brought into its designated, opened end position. The second end 39 of the cable device is fixed on the base part 1 and is guided over the deflection pulleys 15; 17, the stop device 45 and over the deflection pulley 25 of the spring element 11 to the first end 29. The piston rod 19 is then retracted sufficiently far for the stop 35 and the counter stop 37 to come to rest on the spring element 11. In this installed state, the cable device is stressed in a manner free from play between the two ends 29; 39. Finally, a stop ring 47, which can be displaced axially on the cable device 13, is, for adjustment purposes, moved as far as a stop sleeve 49, as part of the stop device on the body part, and fixed in place.

In the position open to the maximum, the cable device is supported on the stop 35 of the connecting head and the two cable sections 41; 43 take on a supporting force. During a closing movement, the spring element 11 exerts a tensile force via the cable device on the body part 5, which is supported on the stop device 45 via the stop ring. The linear section of the cable device between the stop device 45 on the body part 5 and the spring element 11 is thus continuously prestressed. The other linear section between the stop device 45 and the second fastening point 39 on the base part forms an unstressed loop. The abovementioned, favorable principle of displacement ratios between the piston-rod movement and body-part movement is retained.

Figure 3:
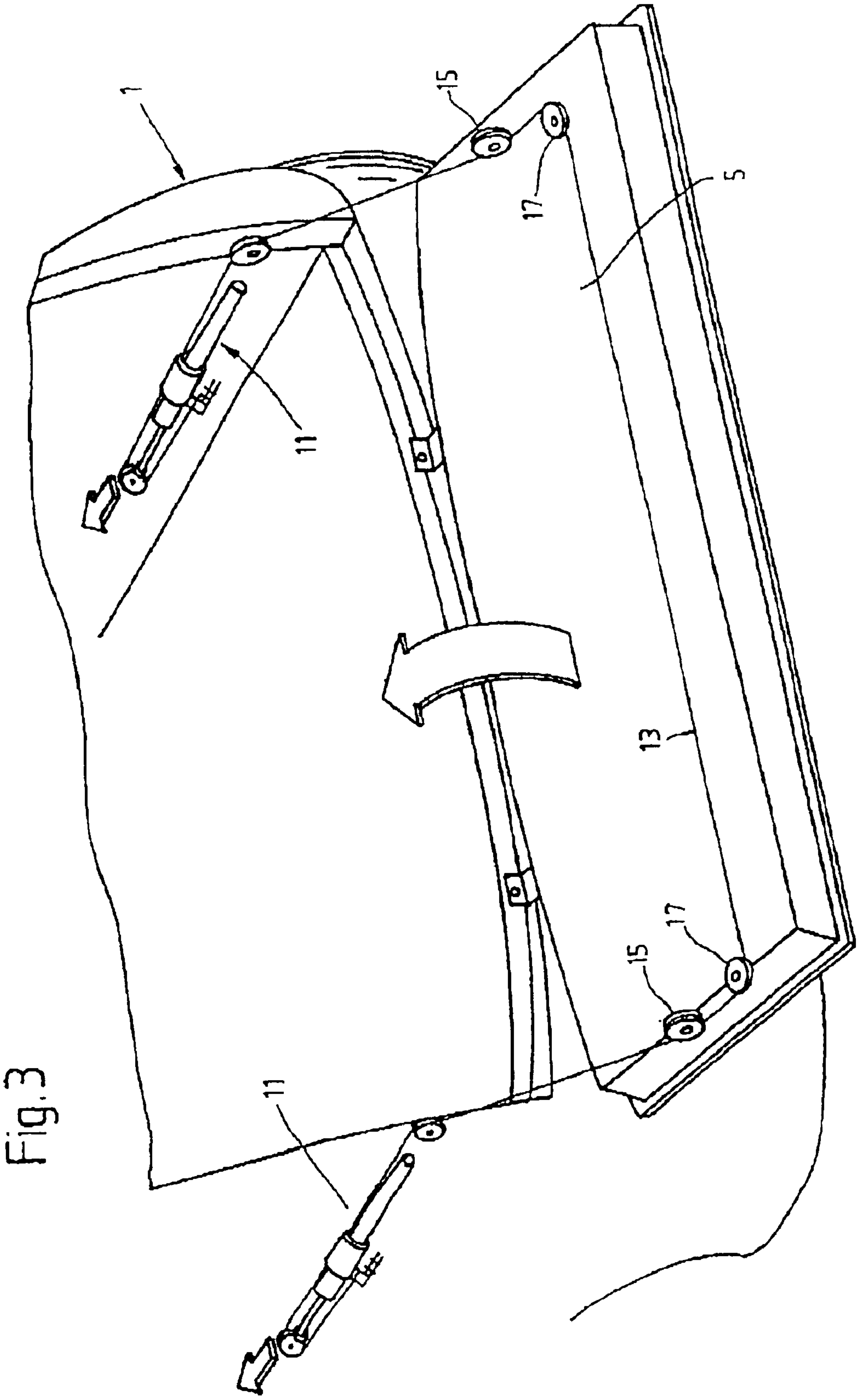
FIG. 3 shows an alternative closing device with two spring elements according to FIG. 2.

FIG. 3 is intended to make clear that, in a departure from the variant according to FIG. 1, two spring elements 11 may also be arranged in a functionally parallel manner, in which case a single cable device 13 is sufficient without the use of a stop device, since the two spring elements 11 always keep the cable device in the prestressed state, i.e. in a state which is free from play, owing to the opposite directions in which their forces act. Of course, within the context of manufacturing tolerances, the two spring elements should have an identical characteristic for their spring force.

Figure 4:
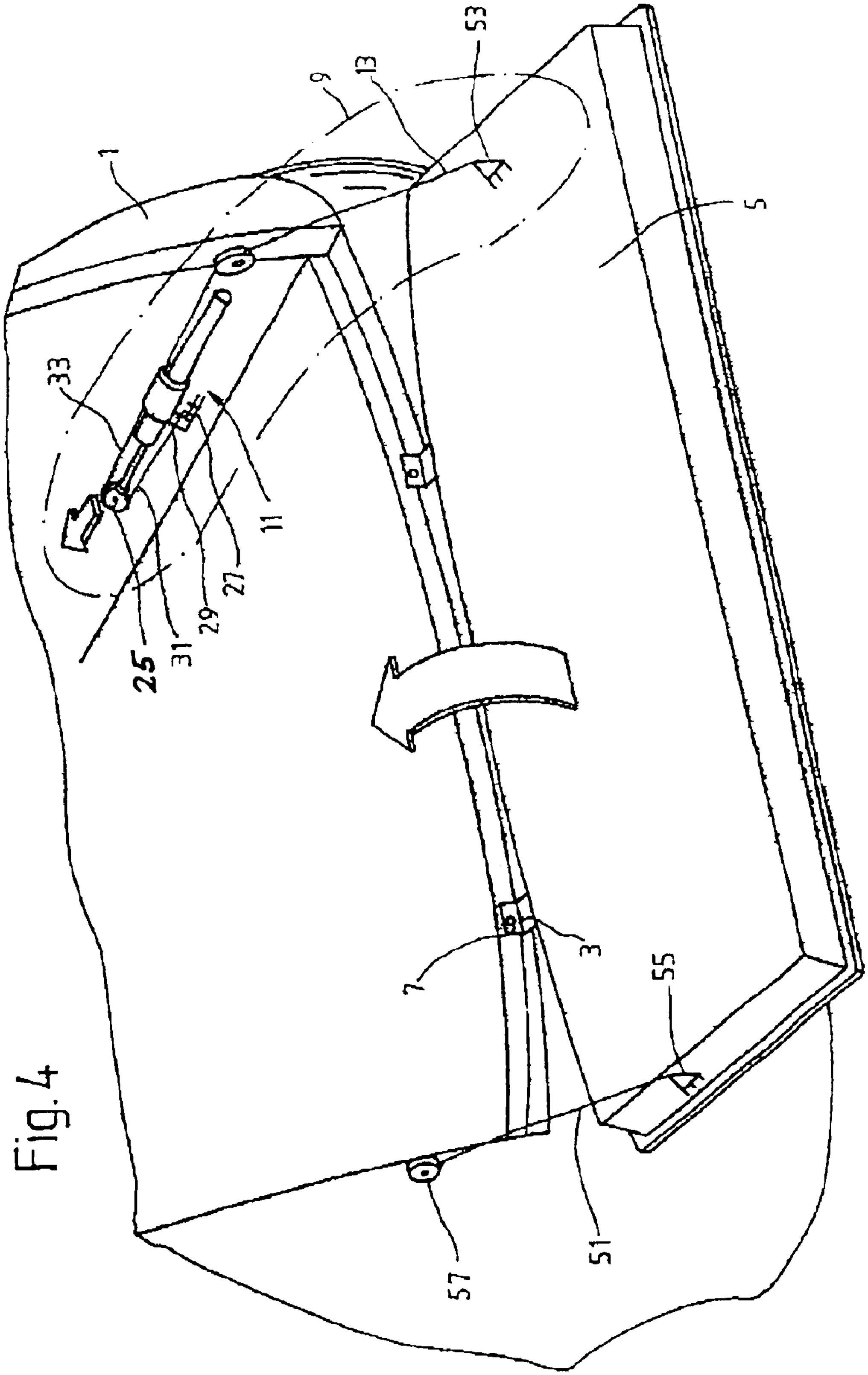
FIG. 4 shows a closing device having two independent cable devices.

FIG. 4 shows a variant in which used next to the cable device 13 is a second, independent cable device 51 which exerts a retaining force in a designated end position of the moveable component 5. The two cable devices are connected to the pivotable body part instead of the deflection pulleys via fixed bearings 53; 55. The cable device 51 is connected to the base part 1 via a fixed bearing 57. In a predetermined opening position of the body part, the two cable devices 13; 51 take on a retaining force, with it being possible, in order to adapt it to fitting tolerances, for, for example, the positionally fixed end 29 to be adjusted (FIG. 2) so as to be able to compensate for any differing cable lengths of the cable devices 13; 51. The spring element 11 corresponds exactly to the refinement according to FIG. 2.

During a closing movement, only the spring element exerts a closing force. The cable device 51 is relaxed and can be guided, if appropriate, by a retractor mechanism.

Two separate cable devices 13; 51, as shown in FIG. 4, with a respective spring element 11 in the spatial arrangement according to FIG. 3 may also be used, and the mechanism of the adjustable fixing sleeve 29*a* may be used in each case in order to adjust the cable lengths.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A closing device for a body part pivotably mounted on a base part, said closing device comprising:

a spring element comprising a cylinder which can be fixed to said base part, a piston rod which is axially moveable in said cylinder, and a deflection pulley mounted on said piston rod; and a cable device having a first end fixed with respect to said cylinder and a second end which can be fixed to said body part, said cable device passing over said deflection pulley between said ends.

2. A closing device as in claim 1 further comprising a stop fixed to said piston rod for limiting retraction of said piston rod in said cylinder.

3. A closing device as in claim 2 wherein said piston rod comprises a connecting head to which said pulley is mounted.

4. A closing device as in claim 3 wherein said stop is part of said connecting head.

5. A closing device as in claim 4 wherein said cylinder comprises a counter stop on which said stop can rest.

6. A closing device as in claim 1 further comprising a securing bracket for supporting said cylinder on said base part, said first end of said cable device being fixed to said securing bracket.

7. A closing device as in claim 1 wherein said cable device has an effective length which can be adjusted by shifting the first end with respect to said cylinder.

8. A closing device as in claim 7 further comprising a fixing sleeve which retains said first end of said cable device, said fixing sleeve being mounted in an adjustable manner.

9. A closing device as in claim 1 further comprising a second cable device which exerts a retaining force on said body part in a designated end position of said body part.

10. A closing device as in claim 1 wherein said cable device further comprises a stop device and two supporting points which can be mounted on said body part, said cable device comprising first and second cable sections on either side of said stop device and supported by respective said support points, said cable sections supporting said body part at a predetermined angular position with respect to said base part, said stop device engaging at least one of said cable sections during closing movement of said body part with respect to said base part.

11. A closing device as in claim 10 wherein said stop device further comprises a stop ring and a stop sleeve fixed to one of said cable sections and resting against said stop sleeve when said body part is in said predetermined angular position, said stop ring being axially displaceable on said one of said cable sections in order to predetermine said predetermined angular position.

12. A closing device as in claim 1 further comprising a second spring element, said cable device passing over a deflecting pulley of said second spring element, said second end being fixed with respect to a cylinder of said second spring element.

* * * * *